UNITED STATES PATENT OFFICE.

EDWARD GOODRICH ACHESON, OF STAMFORD TOWNSHIP, WELLAND, ONTARIO, CANADA.

PROCESS OF DEFLOCCULATING NON-METALLIC AMORPHOUS BODIES.

931,832.  Specification of Letters Patent.  Patented Aug. 24, 1909.

No Drawing.  Application filed July 24, 1908. Serial No. 445,132.

*To all whom it may concern:*

Be it known that I, EDWARD GOODRICH ACHESON, a citizen of the United States, residing in Stamford township, in the county of Welland, Province of Ontario, Canada, have invented certain new and useful Improvements in Processes of Deflocculating Non-Metallic Amorphous Bodies, of which the following is a specification.

In my prior U. S. Patent No. 843,426, granted February 5, 1907, I describe a method of treating amorphous bodies, the general object of which is the disintegration of such amorphous bodies into the finest possible particles or molecules, whereby said fine particles or molecules may be further treated or used in various ways and for many purposes. As stated in that patent, it is exceedingly desirable in many cases that non-fused mineral bodies elemental or compound in character and more particularly amorphous bodies or substances—for instance, like graphite, lampblack, precipitated alumina, clay, siloxicon, and amorphous carbid of silicon—be disintegrated and deflocculated into the finest possible particles or molecules, whereby the particles or molecules may be maintained in this finely subdivided or disintegrated condition, so that, for instance, they will remain suspended in water and can be used in this connection with great advantages, as in lubrication and the like, whereby the deflocculated particles or molecules may be flocculated and otherwise treated and collected for use in various connections, as in the formation of molded and other articles.

I have discovered that certain non-fused mineral bodies, and more particularly amorphous bodies, when treated or subjected to the action of certain materials, as more particularly set forth hereinafter, can not only be disintegrated into exceedingly fine particles or molecules, but they will remain in this condition without the usual tendency to coalesce or flocculate and while in this condition may be used for various purposes.

The deflocculated particles or molecules can be further treated, as herein set forth, so as to cause them to flocculate, and in this way the amorphous bodies may be separated from other bodies, as crystalline bodies, and can be used for various purposes.

In that patent I described the use, for producing this modifying effect on the non-fused mineral bodies, especially the amorphous bodies, of material such as had an astringent tannic principle, such as is ground in gallotannic acid, catechu, extract of straw and the like. In the use of such materials certain difficulties arise, owing to the action of the acid principle on the metal of the vessel or machine in which the operations are carried out, with the formation of salts, which react on and tend to flocculate the already deflocculated body, thereby lowering the efficiency of the process.

My present invention is based on the discovery that organic matter, such as solid excrement of animals, as for example, cows' dung, contains a material which seems to be more efficient than tannin as a deflocculating material, and has the great advantage of being entirely neutral in its reaction, being neither acid nor alkaline.

In carrying out my process the powdered amorphous material is treated with a solution or extract of the excremental material, (which may be in quantity as much as 25% of the powdered amorphous material), and thoroughly worked, as by means of a mortar or pugging mill, wherein it is disintegrated. The material may then be dried and used in various ways, or as when an especially pure, fine, and uniform product is desired the material as it comes from the mill is diluted with water or other liquid in a suitable vessel, and the fine disintegrated and deflocculated particles or molecules of the body being treated are suspended in the liquid and may be caused to float into another vessel or tank, and this may be repeated one or more times. The fine disintegrated and deflocculated particles or molecules may be recovered from the liquid in various ways, preferably by adding to the liquid carrying the particles a small amount of muriatic acid or alum, which will cause the deflocculated particles or molecules to flocculate and settle, whereupon the clear liquid, free from the particles, may be decanted or siphoned off and the particles collected in the form of a very fine powder and washed, dried, or otherwise treated and used; or the deflocculated material may be freed of the greater part of the water in which it is suspended by filtering through a suitable medium, as a rubber film, and the resultant paste of water and deflocculated material, freed from the remaining water by masticating with an oil, the deflocculated material being thereby left as a paste with the oil.

What I claim is:—

1. The method substantially as hereinbefore set forth of disintegrating and deflocculating amorphous bodies, which consists in mixing them with a solution or extract of solid excrement of animals, grinding the mass and separating the deflocculated particles.

2. The method substantially as hereinbefore set forth of disintegrating and deflocculating amorphous bodies, which consists in mixing them with a solution or extract of cows' dung, grinding the mass and separating the deflocculated particles.

In testimony whereof, I affix my signature in presence of two witnesses.

EDWARD GOODRICH ACHESON.

Witnesses:
FRANK N. COE,
WILLIAM H. ARISON.